(12) United States Patent
Hanson et al.

(10) Patent No.: US 12,146,794 B2
(45) Date of Patent: Nov. 19, 2024

(54) INFRARED INSPECTION SYSTEM FOR HEATERS COMPRISED OF POSITIVE TEMPERATURE COEFFICIENT RESISTORS

(71) Applicant: Rosemount Aerospace Inc., Burnsville, MN (US)

(72) Inventors: Daniel Hanson, Shakopee, MN (US); Richard Alan Schwartz, Faribault, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 399 days.

(21) Appl. No.: 17/302,959

(22) Filed: May 17, 2021

(65) Prior Publication Data

US 2022/0364926 A1    Nov. 17, 2022

(51) Int. Cl.
*G06V 10/40*    (2022.01)
*G01J 5/00*    (2022.01)
(Continued)

(52) U.S. Cl.
CPC ............. *G01J 5/0096* (2013.01); *G01J 5/025* (2013.01); *G06T 7/001* (2013.01); *G06V 10/22* (2022.01);
(Continued)

(58) Field of Classification Search
CPC .... G01J 5/0096; G01J 5/48; G01J 5/00; G01J 5/10; G01J 2005/0077; G01J 5/025; G06T 2207/30164; G06T 7/001; G06T 2207/10048; H05B 2203/02; H05B 3/06; H05B 3/20; H05B 3/12; H04N 5/33;
(Continued)

(56) References Cited

U.S. PATENT DOCUMENTS

| | | | | | |
|---|---|---|---|---|---|
| 6,006,051 | A | * | 12/1999 | Tomita | G03G 15/205 399/70 |
| 7,973,639 | B2 | * | 7/2011 | Ihle | H01C 1/1406 29/610.1 |
| 9,097,182 | B2 | * | 8/2015 | Chillar | F02C 6/18 |
| 9,684,978 | B2 | * | 6/2017 | Abreo | G01J 5/04 |

(Continued)

FOREIGN PATENT DOCUMENTS

CN    105620784 A    6/2016
CN    111628248 A    9/2020
(Continued)

OTHER PUBLICATIONS

Extended European Search Report for EP Application No. 22171008. 0, Dated Sep. 21, 2022, pp. 4.

*Primary Examiner* — Molly Wilburn
*Assistant Examiner* — Ahmed A Nasher
(74) *Attorney, Agent, or Firm* — Kinney & Lange, P.A.

(57) ABSTRACT

An apparatus and method for inspecting articles incorporating positive temperature coefficient resistors. The inspection apparatus includes a computing device, a power source, a housing, a support, and a thermal imager, each mounted within an interior volume of the housing. The inspection method includes receiving a first thermal image of the unpowered article mounted within the support and receiving a second thermal image of the powered article after an optimized time delay. The method further includes outputting a health indication of the positive temperature coefficient resistors based on a comparison of the first thermal image and the second thermal image.

16 Claims, 4 Drawing Sheets

(51) Int. Cl.
*G01J 5/02* (2022.01)
*G06T 7/00* (2017.01)
*G06V 10/22* (2022.01)
*G06V 10/75* (2022.01)
*H04N 5/33* (2023.01)

(52) U.S. Cl.
CPC ............ *G06V 10/40* (2022.01); *G06V 10/758* (2022.01); *H04N 5/33* (2013.01); *G01J 2005/0077* (2013.01); *G06T 2207/10048* (2013.01); *G06T 2207/30164* (2013.01)

(58) Field of Classification Search
CPC ........ G01N 25/72; G06V 10/40; G06V 10/22; G06V 10/758
See application file for complete search history.

(56) References Cited

U.S. PATENT DOCUMENTS

| | | | |
|---|---|---|---|
| 10,163,668 | B2 | 12/2018 | Steinhauser |
| 10,895,592 | B2 | 1/2021 | Essawy et al. |
| 11,320,315 | B1* | 5/2022 | Cho .................. G01J 5/064 |
| 2017/0023411 | A1* | 1/2017 | Shima .............. G01J 5/0003 |
| 2018/0128849 | A1* | 5/2018 | Wong ................ G01P 5/165 |
| 2019/0317434 | A1* | 10/2019 | Ogura .............. G03G 15/5062 |
| 2020/0080958 | A1* | 3/2020 | Yang ................ G01N 27/407 |
| 2020/0098513 | A1* | 3/2020 | Zhang .............. G01R 31/1218 |
| 2020/0118189 | A1* | 4/2020 | Wang ................ G06V 10/40 |
| 2021/0295486 | A1* | 9/2021 | Mansell .............. G06T 7/001 |

FOREIGN PATENT DOCUMENTS

| | | |
|---|---|---|
| KR | 20170143094 A | 12/2017 |
| WO | 2016069808 A1 | 5/2016 |

* cited by examiner

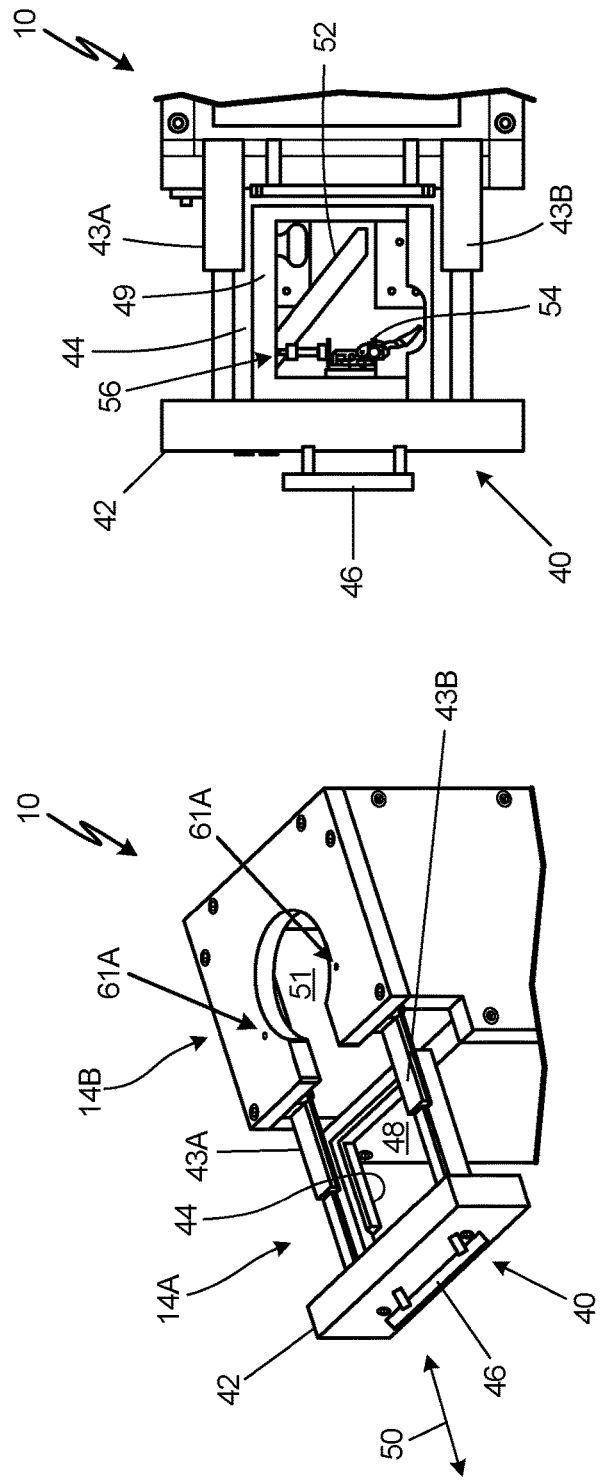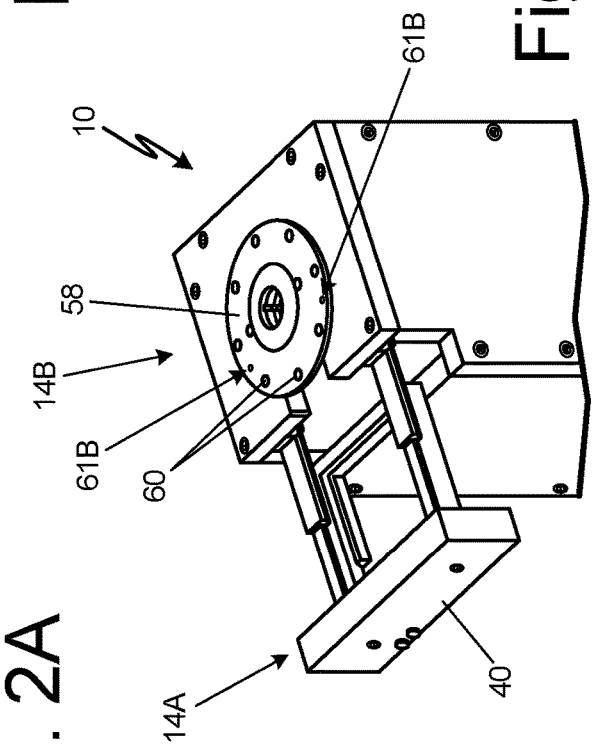

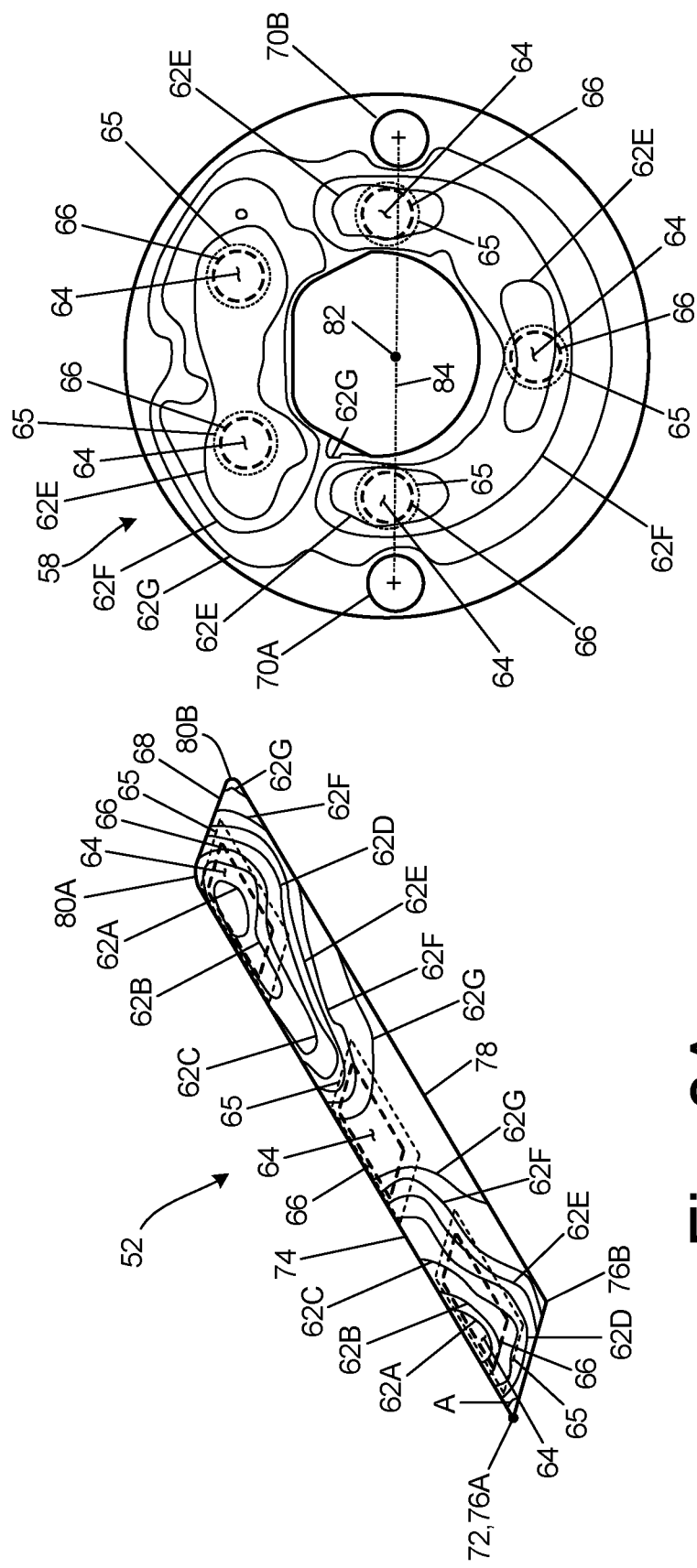

INFRARED INSPECTION SYSTEM FOR HEATERS COMPRISED OF POSITIVE TEMPERATURE COEFFICIENT RESISTORS

BACKGROUND

Positive temperature coefficient resistors or PTCRs are thermistors characterized by an electrical resistance that, within the operational range of the PTCR, increases as the temperature of the PTCR increases and decreases as the temperature of the PTCR decreases. By supplying voltage to the PTCRs within a target voltage range, PTCRs can be utilized as self-regulating heating elements. Because the electrical resistance of a PTCR decreases proportionally to the temperature of the PTCR and the PTCR receives a constant voltage, current through the PTCR increases in this scenario and thereby, increases heat generated by the PTCR. Accordingly, either a single PTCR or multiple PTCRs can be used to provide a simple, self-regulating heater element.

In operation, either a single or multiple PTCR heating elements are installed onto or within a component or article and electrically wired in parallel to a power source. Verified operation of PTCR heating element assembly in an installed condition can be essential to ensuring proper operation of the component. Current methods to verify proper operation of PTCR heater assembly in an installed condition monitor voltage and current or resistance of the heater assembly and, thus, can identify operational variances of the heater assembly, but not individual PTCRs within the assembly. In another method, operational variances of individual PTCRs can be detected by monitoring voltage and current or resistance of the PTCR prior to installation onto or within a component. However, these test methods cannot identify operational variances of individual PTCRs within a multi-chip heater assembly within the operational life of the component.

SUMMARY

A method of inspecting each positive temperature coefficient resistor within a heater assembly of an article in accordance with an exemplary embodiment of this disclosure includes receiving a first thermal image of the article prior to heating the article and receiving a second thermal image of the article after the first thermal image as the positive temperature coefficient resistor heats the article, each image captured by a thermal imager. The method further includes outputting a health indication of at least one of the positive temperature coefficient resistors mounted to or within the article based on a comparison of the first thermal image and the second thermal image.

Another method in accordance with a further example of this disclosure additionally includes outputting multiple health indications based on the comparison of the first thermal image and the second thermal image, each health indication corresponding to one of the positive temperature coefficient resistors.

Another method in accordance with a further example of this disclosure additionally includes identifying two or more exterior features of the article based on the first thermal image and identifying a region within the first and second thermal images corresponding to a position of one of the positive temperature coefficient resistors based on the two or more exterior features of the article. The method further includes determining a temperature difference within the region based on the first thermal image and the second thermal image and comparing the temperature difference to a differential temperature criterion in order to output the health indication.

An apparatus in accordance with an exemplary embodiment of this disclosure includes a housing enclosing an interior volume, a thermal imager, and a support in which the thermal imager and the support are positioned within the interior volume of the housing. The apparatus further includes a power source connected to the positive temperature coefficient resistors of the article and a computing device comprising a processor and computer-readable memory encoded with instructions that, when executed by the processor, cause the apparatus to perform the inspection method.

BRIEF DESCRIPTION OF THE DRAWINGS

FIGS. 2A, 2B, and 2C depict exemplary mounting provisions adapted to inspect an angle of attack sensor vane and a faceplate of the angle of attack sensor.

FIGS. 3A and 3B are schematic examples of thermal images produced by the apparatus.

DETAILED DESCRIPTION

Figure 1B:
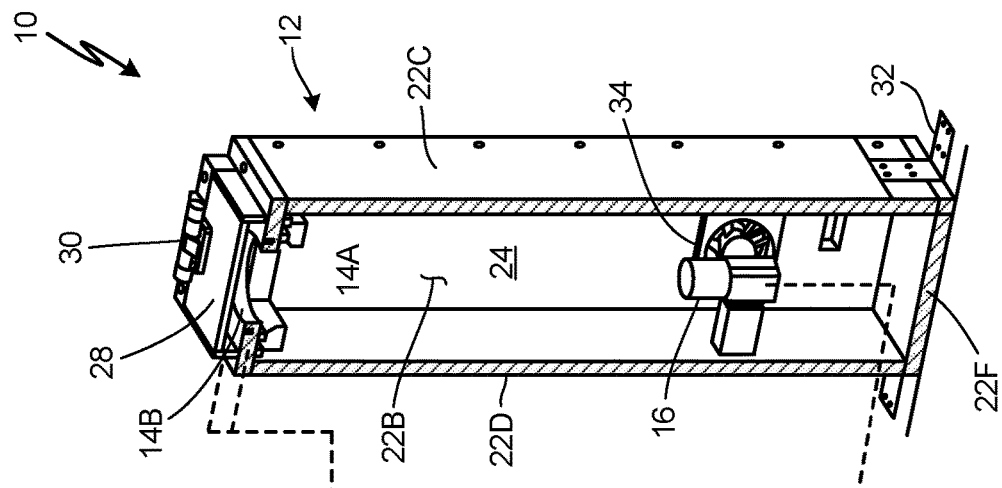
FIGS. 1A and 1B are isometric views of an exemplary apparatus for inspecting components or articles incorporating positive temperature coefficient resistors.

As disclosed herein is an apparatus and methodology for inspecting articles that include at least one positive temperature coefficient resistor (PTCR) mounted to or installed within the article. The apparatus includes a housing enclosing an interior volume, a thermal imager installed within the housing interior, a support adapted to receive the article, and a power source for providing a target voltage to the positive temperature coefficient resistor. Interior surfaces of the housing that bound the interior volume are formed, coated, or lined with a high emissivity material to minimize noise caused by spurious infrared radiation originating or reflecting from the housing walls to the thermal imager. The support includes features adapted to mate with corresponding features of one or more articles. Installation of the article onto the support can be facilitated by a moveable support that translates between an open position providing access to the article and the support from outside of the apparatus housing and a closed position that positions the article and the support within the housing interior and within view of the thermal imager. Alternatively, the support can be fixed within the housing interior, access provided to the support and the article via a cover in an open position that encloses the support and article when in the closed position.

The inspection apparatus may include a single support with multiple thermal imagers, a single thermal imager with multiple supports, or multiple supports and multiple thermal imagers. In this way, the apparatus may facilitate inspection of a fully assembled article, or an article disassembled into multiple subassemblies, each subassembly mounted in a different support. The articles themselves may be any component that incorporates one or more PTCRs, whether installed within the article individually or as part of an assembly of PTCRs. Example articles include various air data probes (i.e., angle of attack vanes, pitot probes, multi-function air data probes, and the like).

Once an article is mated to the apparatus support, the thermal imager captures infrared radiation from the article, producing at least two thermal images of the article sequentially in time or, in some instances, a continuous video, which may be stored as a series of sequentially arranged thermal images captured at a fixed frame rate. The initial image is taken by the thermal imager when the article is not supplied with voltage by the power source (i.e., unpowered) and when the article has a thermal state in equilibrium with the surrounding environment. Subsequent images are taken while applying voltage to the PTCRs with the power source (i.e., powered). Each PTCR location is identified by the apparatus based on a model of the article and evaluated based on a comparison of a temperature difference derived from at least two thermal images, one of which is the initial, unpowered thermal image of the article.

Using this apparatus and method, a single PTCR or multiple PTCRs within an article can be inspected individually without relying on evaluation of the PTCR assembly as a whole. As such, heating profiles produced by one or more PTCRs operating outside specified power ranges within an assembly that otherwise satisfy overall heating requirements of the PTCR assembly can be identified and removed from service, further improving safe operation of articles incorporating PTCRs. Further, by calculating a temperature difference between powered and unpowered PTCRs of an article and comparing this difference to a differential temperature criterion, thermal imagers with relatively high sensitivity yet with insufficient absolute accuracy can be used to detect degraded or nonfunctional PTCRs within an article's heater assembly. For example, a thermal imager with +/−5° C. absolute accuracy can be used to detect 0.1° C. temperature resolution while using an inspection methodology that relies on temperature difference calculations for PTCR evaluation instead of comparing absolute temperature profiles of the PTCR-heated article to an absolute temperature criterion.

Figure 1A:
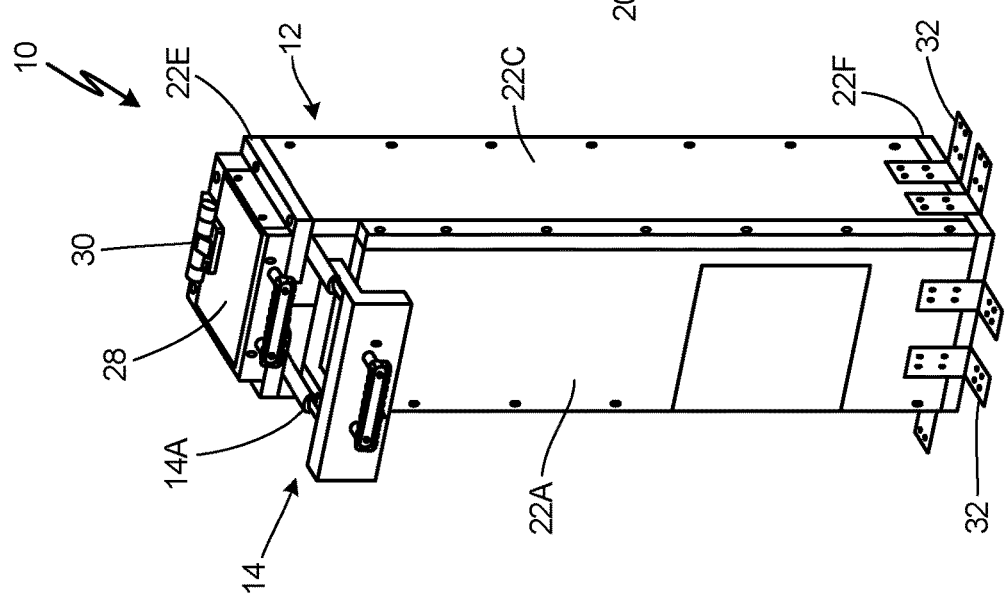

FIGS. 1A and 1B are isometric views of an exemplary test apparatus for inspecting an article with at least one positive temperature coefficient resistor (PTCR) mounted to or installed within the article. FIG. 1A depicts an exterior of apparatus 10, and FIG. 1B is a section view illustrating an interior of apparatus 10. Apparatus 10 includes housing 12, at least one support 14, thermal imager 16, power source 18, and computing device 20 as well as other potential components discussed below.

Housing 12 includes walls 22 that bound interior volume 24 of apparatus 10 in which interior volume 24 is of sufficient size to completely enclose and surround an article mounted to support 14. The configuration of housing 12 is also affected by the size, shape, viewing angle, and focal range or distance of thermal imager 16 such that housing 12 supports thermal imager 16 at a distance from support 14 that is within a focal range of thermal imager 16. As shown in FIGS. 1A and 1B, walls 22 of housing 12 form a rectangular cuboid defined by front wall 22A, back wall 22B, side walls 22C and 22D, top wall 22E, and bottom wall 22F. In other examples, housing 12 can be tubular. In either instance, a longitudinal direction of housing 12 is aligned with a viewing direction of thermal imager 16, which is orientated vertically in this case. In other instances, the longitudinal direction of housing 12 can be aligned with any convenient direction, for example horizontally. While aligning the longitudinal direction of housing 12 vertically minimizes the footprint of apparatus 10, mounting thermal imager 16 in an upward-facing direction at the bottom of housing 12 requires regular lens cleaning that can be reduced by aligning the longitudinal direction of housing 12 horizontally or positioning thermal imager 16 in a downward-facing direction, for example. Interior surfaces 26A, 26B, 26C, 26D, 26E, and 26F of respective walls 22A, 22B, 22C, 22D, 22E, and 22F bound interior volume 24 of apparatus 10.

Walls 22A-22F are formed, coated, or lined with a material having high emissivity to reduce spurious infrared radiation emitted or reflected from interior surfaces 26A-26F of walls 22A-22F. Materials with emissivity of at least 0.5 have been found to be acceptable for certain applications. Where greater sensitivity is required, materials with emissivity greater than 0.5 are required. Typically, materials with an emissivity greater than 0.8 reduce spurious infrared radiation sufficiently for thermal imager 16 to produce thermal images useful for inspection of the article. The specific emissivity requirement for surfaces bounding interior volume 24 will depend on the magnitude of heating provided by PTCRs within the inspected article, the accuracy and sensitivity of thermal imager 16, and the internal geometry of housing 12 including the number of interior walls and respective orientations of walls 22 relative to each other and thermal image 16.

Support 14 can be any structure suitable for mounting, suspending, or locating the article within interior volume 24 of housing 12 while facilitating access to article by an operator of apparatus 10. Support 14 can include moveable structures such as a door, cover, or tray to facilitate both article access as well as a mount location that places article within interior volume 24. In this instance, support 14 is associated with an open position that locates at least a portion of support 14 external to housing 12 along with the article for operator access and a closed position that locates the article and the support within interior volume 24 of housing 12. As depicted in FIGS. 1A and 1B, support 14A takes the form of a tray or drawer that slides linearly outward relative to front wall 22A and perpendicularly to a longitudinal dimension of housing 12. FIG. 1A depicts support 14A in an open position and facilitates loading and access of article for inspection within apparatus 10. FIG. 1B depicts support 14A in a closed position to position an article within interior volume 24 of housing 12.

Alternatively, support 14 may include fixed features that do not enable support 14 to translate relative to housing 12. In these instances, support 14 may be formed by one or more of walls 22A-22F. For example, fixed supports 14 can include openings, counterbores, or recesses in one or more walls 22A-22F of housing 12. Where one of walls 22A-22F of housing 12 includes an opening of support 14 extending therethrough, apparatus 10 can include cover 28 to fully enclose the article. Cover 28 encloses an opening associated with support 14 and can be affixed to housing 12 via fasteners, clamps, or another mechanical means. Other examples of cover 28 are translatable between an open position providing access to support 14 and an article mounted therein and a closed position that encloses support 14 and a mounted article. Apparatus 10 depicted by FIGS. 1A and 1B includes support 14B that includes an opening through top wall 22E. Associated with support 14B is cover 28 that pivots about hinge 30 between an open position (not shown) and a closed position that encloses a backside of an article mounted in support 14B. Housing 12 can be affixed to the floor or other stationary structure via brackets 32 as needed for stability of apparatus 10.

Thermal imager 16 is a receiver receptive to an infrared wavelength range of electromagnetic radiation between approximately 1.4 micrometers and 15 micrometers, or a subrange of infrared wavelength ranges. Housing 12 supports thermal imager 16 at a distance from support 14 that falls within a focus range of thermal imager 16 to provide clear images of an article mounted within support 14. As shown in FIG. 1B, thermal imager 16 is mounted near bottom wall 22F of housing 12 opposite supports 14A and 14B located near top wall 22E. To maintain consistent thermal conditions within apparatus 10, housing 12 can include one or more fans 34 mounted within respective openings through one or more of housing walls 22A-22F.

Power source 18 can be any commercially-available power source capable of providing a regulated or constant target voltage Vs to PTCR within an article housed within apparatus 10. Typically, power supplies capable of providing target voltage Vs+/−5% are considered suitable for apparatus 10 and the following inspection methodology. Power source 18 is electrically connected to one or more sets of leads, each set connected to at least one PTCR to provide target voltage across terminal faces of the PTCRs. Where multiple PTCRs are implemented within an article, power source 18 is connected to an assembly of PTCRs connected in parallel to each other within the article.

Computing device 20 includes one or more processors 36 and computer-readable memory 38 encoded with instructions that, when executed by the processor 36, cause apparatus 10 to perform steps of the inspection methodology discussed in more detail below. Examples of computing devices 20 can include, but are not limited to, portable or mobile devices such as mobile phones (including smartphones), laptop computers, tablet computers, personal digital assistants (PDAs), or other portable or non-portable computing devices. Computing device can include input devices (e.g., keyboard, touch-sensitive and/or presence-sensitive display, camera, microphone, or other type of device configured to receive input), communication devices (e.g., wired and/or wireless network interface card, optical transceiver, radio frequency transceiver, or other type of device that can send and receive information), and output devices (e.g., a display device, sound card, video graphics card, speaker, liquid crystal display (LCD), or other type of device for outputting information).

Processors 36 of computing device 20 are configured to implement functionality and/or process instructions for execution within computing device 20, such as computer-readable instructions stored in computer-readable memory which, when executed by the one or more processors, cause computing device 20 to operate in accordance with techniques described herein. Examples of one or more processors 36 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 38 of computing device 20 can be configured to store information within computing device 20 during operation. Computer-readable memory, in some examples, is described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory of computing device 20 can be a temporary memory, meaning that a primary purpose of the computer-readable memory is not long-term storage. Computer-readable memory of computing device 20, in some examples, is described as volatile memory, meaning that the computer-readable memory does not maintain stored contents when power to computing device 20 is turned off. Examples of volatile memories can include random access memories (RAM), dynamic random access memories (DRAM), static random access memories (SRAM), and other forms of volatile memories. In some examples, computer-readable memory is used to store program instructions and/or information for execution by processor(s) of computing device 20. In some examples, computer readable-memory can include computer-readable storage devices. Computer-readable storage devices can be configured to store larger amounts of information than volatile memory. Storage devices can include, in certain examples, non-volatile storage elements, such as magnetic hard discs, optical discs, flash memories, or forms of electrically programmable memories (EPROM) or electrically erasable and programmable (EEPROM) memories.

FIGS. 2A, 2B, and 2C are views depicted features of supports 14A and 14B in greater detail. FIG. 2A is an isometric view illustrating support 14A in an open position and support 14B with cover removed, each of supports 14A and 14B shown without an article installed. Support 14A includes tray 40 formed by front plate 42 joined to frame 44. Front plate 42 can be equipped with handle 46 or other handle-operated device to facilitate translating support 14A from the open position to the closed position. Frame 44 extends from front plate 42 and circumscribed opening 48 adapter to receive an article or adapter 49 (see FIG. 2B) bridging a common interface of frame 44 and a specific interface of the article. Support 14A includes slides or linear bearings 43A and 43B connecting frame 44 to walls of housing 12, in this instance, top wall 22E and/or side walls 22C, 22D. Slides 43A and 43B facilitate linear sliding motion of support 14A into and out of housing 12 along a direction indicated by arrows 50. Opening 51 and associated article mounting features in top wall 22E of housing 12 form support 14B.

FIG. 2B is a planar view of support 14A in the open position shown with an article installed and associated mounting features. The article depicted by FIG. 2B is vane 52 of an angle of attack sensor. In addition to the features discussed above, support 14A includes clamp 54 for securing vane 52 to frame 44. For locating vane 52 within frame 44 of support 14A, frame 44 can include interface 56. For instance, interface 56 can be a set of threaded holes for attaching vane 52 to frame via one or more fasteners (not shown). In other examples, interface 56 can be one or more locating pins adapter to interface with corresponding features of vane 52, for instance, pre-existing fastener holes used during assembly of the angle of attack vane.

Faceplate 58 of an angle of attack sensor can be installed for inspection in support 14B as shown in FIG. 2C. Mounting holes 60 of faceplate 58 can be utilized to attach faceplate 58 to top wall 22E of housing 12, securing faceplate 58 within support 14B. In other arrangements, faceplate 58 can be clamped to top wall 22E and aligned relative to opening 51 using pins other fasteners and corresponding holes in top wall 22E, and example of which is depicted in FIG. 2A at 61A and in FIG. 2C at 61B. In other instances, faceplate 58 and/or vane 52 can be secured by another mechanical means.

Installing vane 52 within support 14A and translating tray into the closed position positions vane 52 or another article to be viewed by thermal imager 16 during the test. Similarly, faceplate 58 installed in support 14B places faceplate in view of thermal imager 16. Using the depicted apparatus, either vane 52 or faceplate 58 can be viewed by thermal imager 16 at one time. However in other configurations, multiple thermal imagers 16 can be used, each imaging one of vane 52 or faceplate 58. Alternatively, housing 12 can include supports 14A and support 14B arranged to be viewable by thermal image 16 at the same time.

FIGS. 3A and 3B are exemplary thermal images of vane 52 and faceplate 58 during an inspection and after target voltage is applied to PTCRs by power source 18. While thermal images produced by imager 16 may show color contours in practice, FIG. 3A and FIG. 3B depict a series of isothermal lines 62A, 62B, 62C, 62D, 62E, 62F, and 62G (collectively referred to as isothermal lines 62), each line identifying a contour of common temperature that decreases from maximum isothermal line 62A to minimum isothermal line 62G.

In addition to isothermal lines 62, each image may include one or more regions 64 corresponding to locations of PTCRs 65 within vane 52, faceplate 58, or other article. Regions 64 can be represented in the thermal image by boundaries lines 66. While regions 64 can take any shape found to be suitable to produce consistent and accurate results for the inspection methodology, regions 64 typically take a shape that is geometrically similar to the corresponding PTCRs 65. Additionally, the area of each region 64 may be undersized relative to areas of corresponding PTCRs 65. Under sizing region 64 relative to PTCR 65 accounts for positional variances associated with manufacture of vane 52, faceplate 58, or other article, positional or orientational variances associated within installation of vane 52, faceplate 58, or other article within supports 14A, 14B. Additionally, undersized regions 64 mitigate effects associated with propagation of heat through vane 52, faceplate 58, or other article.

Regions 64 are located relative to external features of the article identifiable by computing device 20 within the thermal image. External features can include an outer or peripheral boundary of the article, an expected projection of the article as seen from thermal imager 16, through or fastener holes, and other distinguishing contours and features. Using one or more external features, the orientation of the article can be determined. For example, the orientation of vane 52 can be determined using a projected peripheral boundary as indicated at 68. An orientation of faceplate 58 can be determined using through holes 70A and 70B.

External features and locations of regions 64 relative to those features can be predetermined using a model of the article. For example, commercial computer aided design or CAD software is commonly used to design articles such as components used in angle of attack sensor as well as other modern components. Models generating using CAD software have a detailed geometric definition that can be used to define a reference point based on one or more external features of the article. Subsequently, locations of regions 64 can be defined within the model coordinate system relative to the reference point.

As applied to boundary 68 of vane 52, reference point 72 can be established at one of the corners of boundary 68. In this instance, the inside leading edge corner of peripheral boundary 68 is used as reference point 72, which can be identified by acute included angle A between leading edge 74 and relatively sharp corners 76A and 76B at the leading edge 74 and trailing edge 78 relative to the rounded corners 80A and 80B present at the outboard corners of boundary 68. Similarly, reference point 82 of faceplate 58 can be defined at a location relative to through holes 70A and 70B. For instance, a center of one of through hole 70A or through hole 70B can be used as reference point 82. In other examples, reference point 82 can be defined along line 84 connecting centers of through holes 70A and 70B, for example, a midpoint of line 84. Once location reference point 72 or reference point 82 is identified, locations of regions 64 can be defined for vane 52 or faceplate 58 and other vanes or faceplates of the same part number. Using a similar methodology, reference point and region locations for any article can be determined.

Figure 4:
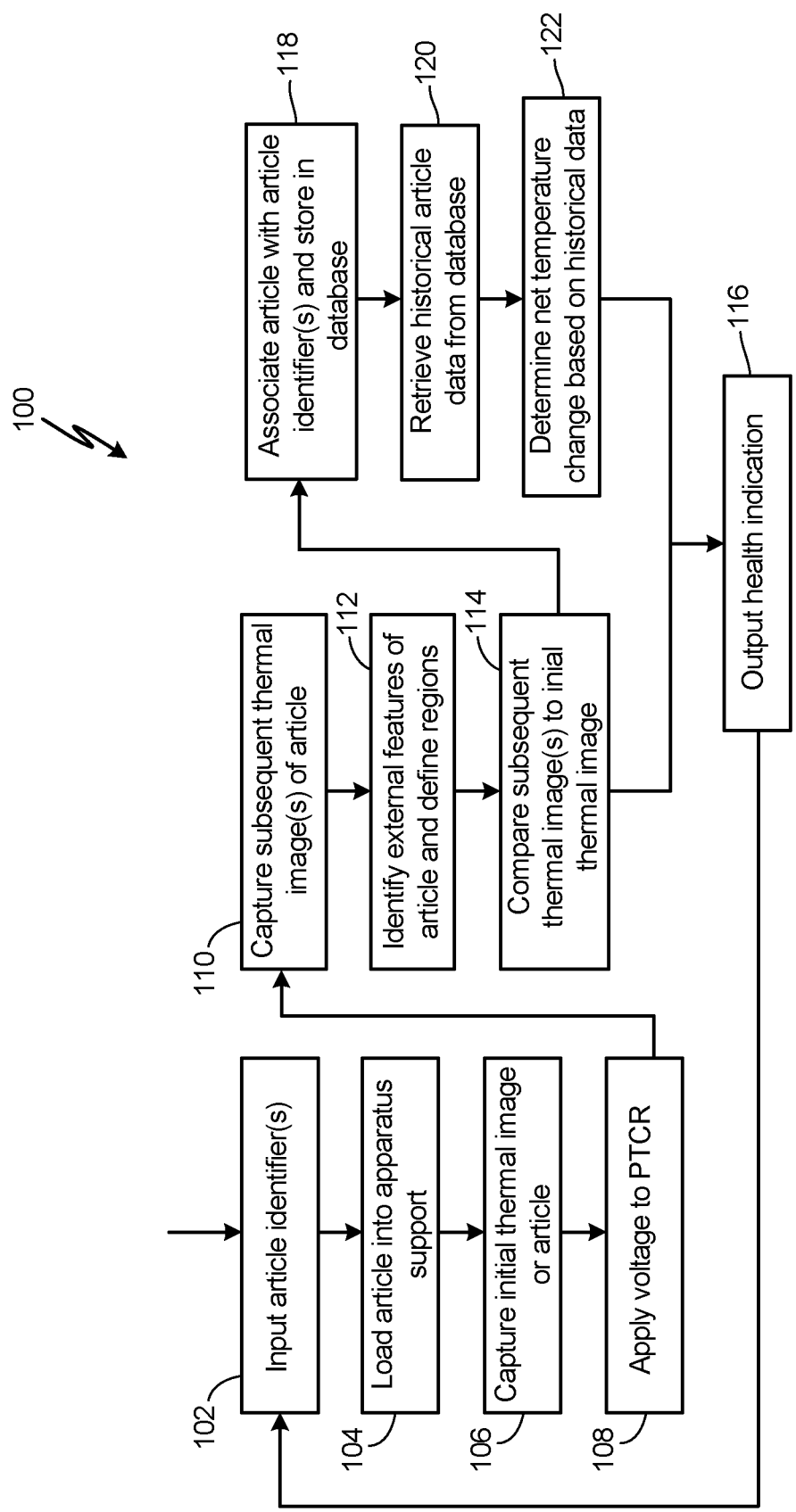
FIG. 4 is a flow chart depicting an exemplary methodology for inspecting articles incorporating at least one positive temperature coefficient resistor.

Inspection of the article, whether the article is vane 52, faceplate 58, or some other component utilizing PTCRs, proceeds by executing inspection methodology 100 that compares multiple temperature profiles of the article, at least one profile captured prior to providing a target voltage to the PTCRs. FIG. 4 is a flow chart describing steps of inspection methodology 100, which includes steps 102, 104, 106, 108, 110, 112, 114, and 116. While the following methodology utilizes thermal imager 16 to capture temperature data of the article, variations of this method could include alternative temperature data sources. For instance, temperature data could be provided by temperature sensors (e.g., thermocouples) temporarily attached to the article at key locations (e.g., within regions corresponding to PTCRs).

To prepare apparatus 10 for an inspection, an operator inputs one or more part identifiers associated with an article to be inspected using an input device of computing device 20 in step 102. For example, the operator may input a part number of the article using a keyboard or touch screen of computing device 20. In other instances, the operator may scan a barcode or RFID tag accompanying or mounted to the article and encoded with the part number. The part number can be any alphanumeric string that distinguishes a geometric configuration of the article from other articles. For example, the part number associated with vane 52 of angle of attack sensor will be different than the part number associated with faceplate 58. Since it is common to manufacture multiple articles of a particular geometric configuration (i.e., vanes 52 or faceplates 58), the operator may also input a serial number distinguishing one article from other articles having the same geometric configuration. For instance, all vanes 52 will have a unique serial number among the serial numbers of other vanes 52, but its part number will be common to all vanes 52 having the same geometry. Similarly, each faceplates 58 with have a serial number unique among faceplates 58 of the same geometry while sharing the same part number. Like part numbers, serial numbers can be any alphanumeric string that distinguishes a particular article among a group of articles of a common part number.

In step 104, an operator loads one or more articles in corresponding supports 14 of apparatus 10. In one example, an operator can load vane 52 into support 14A by securing vane 52 to frame 44 of tray 40 using clamp 54 while tray 40 is in the open position and electrically connects one or more PTCRs within vane 52 to power source 18. Thereafter, the operator translates tray 40 into the closed position, placing vane 52 within interior volume 24 and within view of thermal imager 16. In another example, the operator can load faceplate 58 into support 14B with its interior face inward by attaching faceplate 58 to top wall 22E using alignment pins to engage holes 61 in top wall 22E while cover 28 is in an open position. As installed in support 14B, the interior face of faceplate 58 is within view of thermal imager 16. Following fastening of faceplate 58, the operator electrically connects one or more PTCRs within faceplate 58 to power source 18 and closes cover 28.

After loading the article into support 14 of apparatus 10, the operator initiates inspection by interacting with the input device of computing device 20 in step 106, causing thermal imager 16 to capture a thermal image of the article while one or more PTCRs are unpowered (i.e., power source 18 is not providing target voltage to PTCRs). Computing device 20 associates this first or initial thermal image with a first time stamp.

Following capture of the first thermal image, computing device 20 causes power source 18 to apply target voltage to the PTCR or PTCRs within the article in step 108. After a time delay measured from the application of the target voltage, computing device 20 causes thermal imager 16 to capture a second thermal imager of the article in step 110. The extent of the time delay depends on the number and configuration of PTCRs mounted to or within the article and the mass of the article. Larger mass articles and/or fewer or lower-power PTCRs can require greater time delays whereas lower mass articles and/or more or higher-power PTCRs may require relatively less time delay. Further, articles with dense PTCR spacings require less time delay than analogous articles with sparse PTCR spacing. In some embodiments, the time delay is less than fifteen seconds from application of the target voltage until the second thermal image is captured. In other embodiments, the time delay is less than five seconds. In still other embodiments, the time delay is two seconds or less. Advantageously, the time delay can be selected such that the second thermal image of the article occurs during a thermal transient of the article before functioning PTCRs can saturate adjacent regions of the article and obscure a temperature profile characteristic of a failed or degraded PTCR among a group of PTCRs of the article. The precise time delay is article specific and is selected as the time duration that produces a consistent temperature gradient within the article while also maximizing, to the extent possible, a temperature difference between a functioning PTCR and an adjacent failed PTCR.

In step 112, computing device 20 identifies external features of the article from the first thermal image based on a model of the article retrieved from computer-readable storage, or from a local or remote database via a communications network. Based on the external features of the article, computing device 20 defines one or more regions 64 relative the external features of the article. Locating each region 64 can include defining a reference point based on the external features that defines a local coordinate system of the article and retrieving region definitions defined by the model relative to the reference point. Where features of apparatus 10 allow for closer alignment between the article and thermal imager 16, step 112 can be omitted.

In step 114, computing device 20 compares the first and second thermal images. Comparison of the first and second thermal images can include calculating a first average temperature within each of one or more regions 64 of the article based on the first thermal image and calculating a second average temperature within each of the regions 64 based on the second thermal image. Based on the calculated average temperatures for each region 64, computing device 20 can determine a temperature difference between the first average temperature and the second average temperature corresponding to each region 64.

Following this comparison, computing device 20 outputs a health indication of each PTCR within the article in step 116, each health indication based on the comparison between the first and second thermal images and a differential temperature criterion. The differential temperature criterion can be established from prior inspections of a specific article, or other articles with the same geometry and PTCR configuration. In some cases, multiple articles known to be fully-functional, known to contain at least one failed or degraded PTCR, or a combination of articles, some containing fully-functional and some containing failed or degraded PTCRs, are evaluated to establish the differential temperature criterion. For instance, if the difference between average temperature for a particular region 64 is less than or equal to the differential temperature criterion, computing device 20 may output a heath indication representative of a failed or degraded PTCR of the article. When the difference between average temperatures for region 64 is greater than the differential temperature criterion, the health indication outputted by computing device 20 may indicate a healthy or operative PTCR. Alternatively, computing device 20 may output a health indicator only when the comparison of the first and second thermal images is indicative of a failed or degraded PTCR and not provide any indication when the temperature comparison indicates a healthy or operative PTCR.

In one example of a heath indicator, computing device 20 displays the second thermal image and highlights regions 64 that do not satisfy the differential temperature criterion by displaying boundaries of these regions 64 while not displaying boundaries of regions 64 that satisfy the differential temperature criterion. In another example, computing device 20 may display the second thermal image with the boundaries of each region 64 displayed. In this instance, regions 64 that do not satisfy the differential temperature criterion may be differentiated from satisfactory regions with color, or a symbol displayed within or adjacent to the regions 64 that fail the differential temperature criterion. In yet other embodiments, the computing device may not display the second thermal image at all, and instead highlighting regions 64 using any of the methods described above on a schematic representation of the article.

Inspection methodology 100 may include additional steps useful for identifying trends of individual PTCRs associated with a particular article part number and serial number. In this case, inspection methodology 100 can include steps 118, 120 and 122. In step 118, computing device 20 associates one or more of first thermal image, second thermal image, calculated PTCR average temperatures, and PTCR temperature differences with the part number and serial number of a particular article. This article data is communicated to a database via a communications network where the article data is stored. Periodically, upon completion of each inspection, or upon request of the operator, computing device 20 retrieves article data from past inspections in step 120. Subsequently in step 122, computing device 20 calculates a net change in average temperature of each PTCR associated with the article. When the net change in temperature exceeds a net change threshold criterion, computing device 20 outputs an indication of PTCR degradation to the operator. For instance, computing device 20 may display an additional warning message or highlight regions 64 displayed along with the second thermal image or article schematic and health indication in step 116. While the precise net change threshold criterion depends on the article, PTCR configuration, and article duty cycle, among other factors, the net change threshold criterion is equal to a 10% change between the average temperature of region 64 calculated based on a second thermal image during a first inspection and the average temperature of region 64 in the second thermal image during any subsequent or current inspection. In other embodiments, the net change threshold criterion is less than 5% while in still other embodiments, the net change threshold criterion is less than 1%. With the inspection methodology described by steps 118, 120, and 122, computing device 20 may identify PTCRs that have degraded to a condition with an increased risk of failure prior to triggering a health indication warning in accordance with step 116.

Discussion of Possible Embodiments

The following are non-exclusive descriptions of possible embodiments of the present invention.

A method of inspecting an article comprising a plurality of positive temperature coefficient resistors includes, among other things, receiving a first thermal image of an article at a first time and receiving a second thermal image of the article at a second time after the first time, each image captured by a thermal imager. Additionally, the method includes outputting a health indication of a first positive temperature coefficient resistor among the plurality of positive temperature coefficient resistors based on a comparison between the first and second thermal image.

The method of the preceding paragraph can optionally include, additionally and/or alternatively, any one or more of the following features, configurations, additional components, and steps.

A further embodiment of the foregoing method can include supplying, using a power source, a target voltage across each of the plurality of positive temperature coefficient resistors after the first time and up to the second time.

A further embodiment of any of the foregoing methods can include identifying two or more exterior features of the article based on the first thermal image.

A further embodiment of any of the foregoing methods can include identifying a region with the first and second images corresponding to a position of the first positive temperature coefficient resistor based on the two or more exterior features of the article.

A further embodiment of any of the foregoing methods can include determining a temperature difference within the region between the first and second thermal images.

A further embodiment of any of the foregoing methods can include determining a first average temperature of the region based on the first thermal image.

A further embodiment of any of the foregoing methods can include determining a second average temperature of the region based on the second thermal image.

A further embodiment of any of the foregoing methods can include determining the temperature difference within the region based on the first average temperature and the second average temperature.

A further embodiment of any of the foregoing methods, wherein the region can have a geometrically similar shape to the first positive temperature coefficient resistor.

A further embodiment of any of the foregoing methods, wherein the area of the region can be smaller than an area of the first positive temperature coefficient resistor.

A further embodiment of any of the foregoing methods, wherein the two or more exterior features of the article can be identified based on a model of the article.

A further embodiment of any of the foregoing methods can include associating the health indication with a part number and serial number of the article.

A further embodiment of any of the foregoing methods can include transmitting, via a communication network, the health indication, part number, and serial number to a database.

A further embodiment of any of the foregoing methods can include installing the article within a housing bounded by the surfaces, each surface having an emissivity greater than 0.8.

A further embodiment of any of the foregoing methods, wherein less than 15 seconds can elapse between supplying the target voltage to the plurality of positive temperature coefficient resistors and the second time.

A further embodiment of any of the foregoing methods can include outputting a plurality of health indications based on the comparison of the first thermal image and the second thermal image, wherein each health indication of the plurality of health indications corresponds to one of the plurality of positive temperature coefficient resistors, and wherein the health indication of the first temperature coefficient resistor is among the plurality of health indications.

An apparatus for inspecting an article that includes a plurality of positive temperature coefficient resistors includes, among other possible things, a housing enclosing an interior volume, a thermal imager mounted within the interior volume, a support within the interior volume that includes an interface adapter to receive the article, a power source, and a computing device comprising a processor and computer-readable memory encoded with instructions that, when executed by the process, cause the apparatus to perform steps of the inspection method. Executing these instructions causes the apparatus to receive, by the thermal imager, a first thermal image of the article at a first time and receive, by the thermal imager, a second thermal image of the article at a second time after the first time. The instructions may additionally cause the apparatus to output a health indication of a first positive temperature coefficient resistor of the plurality of positive temperature coefficient resistors based on a comparison between the first and second thermal image.

The apparatus of the preceding paragraph can optionally include, additionally and/or alternatively, any one or more of the following features, configurations, additional components, and steps.

A further embodiment of the foregoing apparatus can include instructions, that when executed by the processor, cause the apparatus to supply, using the power source, a target voltage across each of the plurality of positive temperature coefficient resistors after the first time and up to the second time.

A further embodiment of the foregoing apparatus can include a user interface.

A further embodiment of the foregoing apparatus, wherein the apparatus can communicate with a database via a communications network.

A further embodiment of the foregoing apparatuses, wherein the computing device can be encoded with instructions that when executed by the processor, cause the apparatus to identify two or more exterior features of the article based on the first thermal image.

A further embodiment of the foregoing apparatus, wherein the computing device can be encoded with instructions that when executed by the processor, cause the apparatus to identify a region within the first and second thermal images corresponding to a position of the first positive temperature coefficient resistor based on the two or more exterior features of the article.

A further embodiment of any of the foregoing apparatuses, wherein the computing device is encoded with instructions that, when executed by the processor, cause the apparatus to associate the health indication with a part number and serial number of the article.

A further embodiment of any of the foregoing apparatuses, wherein the computing device can be encoded with instructions that, when executed by the processor, cause the apparatus to transmit, via a communications network, the health indication, part number, and serial number to a database.

A further embodiment of any of the foregoing apparatuses, wherein the computing device can be encoded with instructions that, when executed by the processor, cause the apparatus to determine a first average temperature of the region based on the first thermal image.

A further embodiment of any of the foregoing apparatuses, wherein the computing device can be encoded with instructions that, when executed by the processor, cause the apparatus to determine a second average temperature of the region based on the second thermal image.

A further embodiment of any of the foregoing apparatuses, wherein the computing device can be encoded with instructions that, when executed by the processor, cause the apparatus to determine the temperature difference within the region based on the first average temperature and the second average temperature.

A further embodiment of any of the foregoing apparatuses, wherein the region can have a geometrically similar shape to the first positive temperature coefficient resistor.

A further embodiment of any of the foregoing apparatuses, wherein an area of the region can be smaller than an area of the first positive temperature coefficient resistor.

A further embodiment of any of the foregoing apparatuses can include a display.

A further embodiment of any of the foregoing apparatuses, wherein the computing device can be encoded with instructions that, when executed by the processor, cause the apparatus to output the health indication to the display.

A further embodiment of any of the foregoing apparatuses, wherein less than 15 seconds elapses between supplying the target voltage and the second time.

A further embodiment of any of the foregoing apparatuses, wherein the computing device can be encoded with instructions that, when executed by the processor, cause the apparatus to output a plurality of health indications based on the comparison of the first thermal image and the second thermal image, wherein each health indication of the plurality of health indications corresponds to one of the plurality of positive temperature coefficient resistors, and wherein the health indication of the first temperature coefficient resistor is among the plurality of health indications.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A method of inspecting an article comprising a plurality of positive temperature coefficient resistors, the method comprising:
   receiving, by a thermal imager, a first thermal image of the article at a first time;
   identifying two or more exterior features of the article based on the first thermal image;
   receiving, by the thermal imager, a second thermal image of the article at a second time after the first time;
   supplying, using a power source, a target voltage across each of the plurality of positive temperature coefficient resistors after the first time and up to the second time;
   identifying a region within the first and second thermal images corresponding to a position of a first positive temperature coefficient resistor among the plurality of positive temperature coefficient resistors based on the two or more exterior features of the article; and
   outputting a health indication of the first positive temperature coefficient resistor based on a comparison between the first thermal image and the second thermal image, wherein the health indication represents one of an operative condition, an inoperative condition, and a degraded condition of the first positive temperature coefficient resistor.

2. The method of claim 1, wherein the comparison between the first and second images includes determining a temperature difference within the region between the first and second thermal images and comparing the temperature difference to a differential temperature criterion.

3. The method of claim 2, wherein the comparison between the first and second thermal images includes:
   determining a first average temperature of the region based on the first thermal image;
   determining a second average temperature of the region based on the second thermal image; and
   determining the temperature difference within the region based on the first average temperature and the second average temperature.

4. The method of claim 1, wherein the region has a geometrically similar shape to the first positive temperature coefficient resistor, and wherein an area of the region is smaller than an area of the first positive temperature coefficient resistor.

5. The method of claim 1, wherein the two or more exterior features of the article are identified based on a model of the article.

6. The method of claim 1, further comprising:
   associating the health indication with a part number and a serial number of the article; and
   transmitting, via a communications network, the health indication, the part number, and the serial number to a database.

7. The method of claim 1, further comprising:
   installing the article within a housing bound by walls, each wall having an emissivity greater than 0.8.

8. The method of claim 1, further comprising:
   outputting a plurality of health indications based on the comparison of the first thermal image and the second thermal image, wherein each health indication of the plurality of health indications corresponds to one of the plurality of positive temperature coefficient resistors, and wherein the health indication of the first temperature coefficient resistor is among the plurality of health indications, and wherein each health indication represents one of an operative condition, an inoperative condition, and a degraded condition of respective positive temperature coefficient resistors.

9. An apparatus for inspecting an article that includes a plurality of positive temperature coefficient resistors, the apparatus comprising:
   a housing enclosing an interior volume;
   a thermal imager mounted within the interior volume;
   a support within the interior volume that includes an interface adapted to receive the article;
   a power source; and a computing device comprising a processor and computer-readable memory encoded with instructions that, when executed by the processor, cause the apparatus to:
receive, by the thermal imager, a first thermal image of the article at a first time;
identify two or more exterior features of the article based on the first thermal image;
receive, by the thermal imager, a second thermal image of the article at a second time after the first time;
supply, using the power source, a target voltage across each of the plurality of positive temperature coefficient resistors after the first time and up to the second time;
identify a region within the first and second thermal images corresponding to a position of a first positive temperature coefficient resistor among the plurality of positive temperature coefficient resistors based on the two or more exterior features of the article; and
output a health indication of the first positive temperature coefficient resistor based on a comparison between the first thermal image and the second thermal image, wherein the health indication represents one of an operative condition, an inoperative condition, and a degraded condition of the first positive temperature coefficient resistor.

10. The apparatus of claim 9, wherein the computing device includes a user interface and communicates to a database via a communications network, and wherein the computing device is encoded with instructions that, when executed by the processor, cause the apparatus to retrieve two or more exterior features of the article from a model of the article based on a part number received by the computing device via the user interface.

11. The apparatus of claim 9, wherein the computing device is encoded with instructions that, when executed by the processor, cause the apparatus to:
associate the health indication with the part number and a serial number of the article; and
transmitting, via a communications network, the health indication, the part number, and the serial number to a database.

12. The apparatus of claim 9, wherein the computing device is encoded with instructions that, when executed by the processor, cause the apparatus to determine a temperature difference within the region between the first and second thermal images and compare the temperature difference to a differential temperature criterion.

13. The apparatus of claim 12, wherein the computing device is encoded with instructions that, when executed by the processor, cause the apparatus to:
determine a first average temperature within the region based on the first thermal image;
determine a second average temperature within the region based on the second thermal image; and
determine the temperature difference within the region based on the first average temperature and the second average temperature.

14. The apparatus of claim 9, wherein the region has a geometrically similar shape to the first positive temperature coefficient resistor, and wherein an area of the region is smaller than an area of the first positive temperature coefficient resistor.

15. The apparatus of claim 9, wherein the computing device includes a display, and wherein the computing device is encoded with instructions that, when executed by the processor, cause the apparatus to output the health indication to the display.

16. The apparatus of claim 9, wherein the computing device is encoded with instructions that, when executed by the processor, cause the apparatus to output a plurality of health indications based on the comparison of the first thermal image and the second thermal image, wherein each health indication of the plurality of health indications corresponds to one of the plurality of positive temperature coefficient resistors, and wherein the health indication of the first temperature coefficient resistor is among the plurality of health indications, and wherein each health indication represents one of an operative condition, an inoperative condition, and a degraded condition of respective positive temperature coefficient resistors.

* * * * *